United States Patent

Olde

[15] 3,646,955
[45] Mar. 7, 1972

[54] WATER-FEEDING DEVICE

[72] Inventor: Jarl Rune Olde, Vardsatravagen 71,750, 10 Uppsala, Sweden

[22] Filed: May 6, 1970

[21] Appl. No.: 35,072

[30] Foreign Application Priority Data

May 8, 1969 Sweden..................................6550/69

[52] U.S. Cl...............................137/382, 119/75, 251/303, 251/339
[51] Int. Cl........................................................A01k 07/00
[58] Field of Search....................137/377, 381, 382, 382.5; 119/72.5, 75; 251/303, 339

[56] References Cited

UNITED STATES PATENTS

| 2,672,879 | 3/1954 | Downin | 137/382 |
| 2,710,594 | 6/1955 | Thompson | 251/339 X |
| 3,179,085 | 4/1965 | McKillip | 119/75 |
| 3,289,635 | 12/1966 | Eagles | 119/72.5 |

FOREIGN PATENTS OR APPLICATIONS

| 1,933,655 | 1/1970 | Germany | 119/75 |

*Primary Examiner*—Henry T. Klinksiek
*Attorney*—Leon Edelson and Walter B. Udell

[57] ABSTRACT

A device for connection to a liquid supply system has a valve mechanism defining an open position for permitting liquid flow and a closed position shutting off liquid flow. An actuator member is operably connected to the valve mechanism for moving the valve mechanism from its closed position into its open position. A protecting lip is connected to the valve mechanism and arranged to at least partially surround the actuator member to prevent the valve mechanism from being inadvertently operated.

8 Claims, 3 Drawing Figures

INVENTOR
Jarl Rune Olde

WATER-FEEDING DEVICE

The present invention relates to a metering device for liquids and more particularly to to a suction watering valve for animals.

The purpose of the present invention is to provide a suction watering valve adapted to be mounted substantially horizontally—although for some applications other directions may be preferable in such a way that the device projects from, e.g., the wall of a stable for animals. The animal or animals can easily suck up water merely by opening its mouth and placing it over the device, which by the action caused thereby discharges water to a predetermined amount. However, it is an essential feature of the present invention that the device does not discharge water when unintentionally touched and that the device discharges water in such a way that unnecessary splashing in connection with the drinking is avoided.

Previously known devices of this kind have discharged water when unintentionally touched and sometimes discharge also in such a way during drinking that a great amount of water has been splashed around.

The present invention overcomes the above-mentioned disadvantages of the known devices and attains the purpose in question by the provision of a watering valve of the kind referred to in the accompanying claims.

Figure 1:
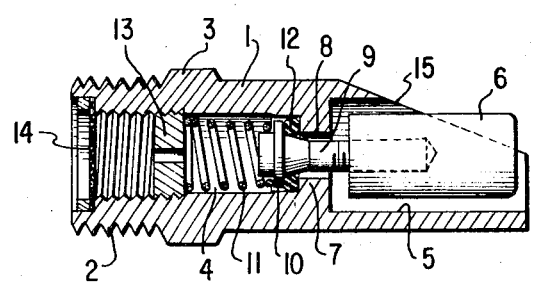
Figure 2:
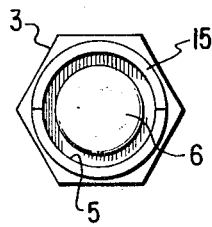
Figure 3:
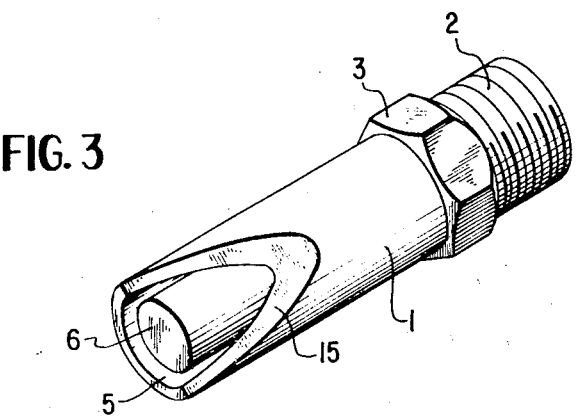

The invention is described below in greater detail in connection with the accompanying drawing in which:

FIG. 1 is a longitudinal cross-sectional view of a device constructed in accordance with the present invention showing the valve spindle in elevation, FIG. 2 is an end view of the device of FIG. 1, and FIG. 3 is a perspective view of the device of FIGS. 1 and 2.

The metering device, or suction watering valve, of the invention comprises a substantially cylindrical portion 1 in which the portion to be connected to a water supply system (not shown) is provided with threads 2 for screw fastening of the device. In order to facilitate the mounting, an adjacent portion 3 is shaped as a polygonal nut. The projecting end of the device, which is intended for drinking, is shaped as a plain tube which has a beveled, or cutaway portion, 15 angled from a plane through the axis of the cylindrical portion or, tube, and extending rearwardly and upwardly to a point located a distance inwardly of an actuator 6 so that the rear edge of the actuator 6 is hidden in the tubular portion. Seen from above, the tubular portion of the device of FIG. 1 is beveled to show an opening shaped as a half ellipse in which the actuator 6 is accessible for actuation. This is clear from FIG. 3.

In the cylindrical portion 1 bores are provided from both ends. One bore 4 contains a valve mechanism and the other bore 5 the actuator 6 for actuating the valve. Between the two bores there is a wall 7 having a central opening 8 through which a valve spindle 9 extends with a clearance sufficient to permit waterflow therethrough around spindle 9. Spindle 9 is connected to actuator 6 by screw thread so that actuator 6 forms an extension of spindle 9.

The valve mechanism proper defines an open and closed position and is of conventional construction having a valve disc 10 rigidly fixed to the valve spindle 9 and retained in sealing engagement with a valve seat 12 in this case constituted by an resilient O-ring, by the thrust exerted by a spring 11 and/or the water pressure. The valve further comprises a constriction 13 which is exchangeable in order to adapt the device to the actual water pressure and which at the same time forms a support for spring 11, and a filter 14 adapted to prevent solids from entering the valve mechanism and thereby to cause malfunction.

The actuator 6 is received in the bore 5 and is located therein in a position to be contacted by the animal during drinking, i.e., when the animal is opening its mouth over the device, thereby to operate the valve. The dimensions of actuator 6 are so chosen that the actuator cannot be moved a great distance, but contacts the inner wall of the bore 5 after a slight movement. This reduces the wear of the valve mechanism. Due to the bevel 15, the animal cannot get a bite grip on the actuator 6, especially as the actuator 6 is more extended in the bore 5 than it is exposed in the beveled portion 15.

As is clear from the above description, the metering device of the present invention is very simple and reliable and can be mounted in a stable manner. This affords the advantage that, e.g., cows, which are inclined to rub themselves against projecting objects and with a great force, can do that without damaging the device and without any discharge therefrom as the actuating means 6 is well protected from unintentional actuation due to the fact that the tubular outer portion protrudes beyond the actuator a certain distance (FIGS. 1 and 3).

The operation of the device is very simple. As soon as the animal opens its mouth over the suction valve of the invention and starts sucking, the upper jaw or palate of the animal contacts the actuator 6 which thereby is forced against the tubular portion acting as a support and partly surrounding the actuator 6. The latter is then depressed in an arbitrary direction; the valve delivering water independently of the exact direction of movement of the valve spindle 9. The valve spindle 9 and its actuator 6 are so mounted that they are freely movable laterally and rearwardly and can also be turned around. Hence, when the valve disc 10 is lifted off its seat 12 the valve mechanism moves from its closed position to its open position and a water path is opened through the clearance between the valve spindle 9 and the wall of the opening 8. Then water is flowing therethrough and along the conduit constituted by the inner walls of the bore or tube 5. Hereby, the favorable result is obtained that —as distinguished from previously known devices of corresponding types —the drinking animal can be supplied with water so deeply in the mouth that very little, if any, splashing takes place during the drinking. At the same time, the conduit 5 acts as a protecting lip for the actuator 6, as is previously mentioned.

It is quite clear to a man skilled in the art that the present invention can be used by nearly all animals, although it is primarily intended to be used by horses, pigs, cows and similar domestic animals. Further, the field of use is not restricted to water, but the valve can be used in connection with any liquid and it can as well be mounted in any position other than in the horizontal if preferable for a special type or size of animal, and it might be recommendable in some cases to turn the protecting lip 5 into a position over or to the side of the actuator 6.

I claim:

1. An animal-watering device comprising an open-ended tubular body member having means at one open end thereof for securing it to a source of water supply with its opposite end extending freely open to atmosphere whereby the bore of said member serves as a conduit for flow of water from said source to and through said freely extending open end of said member, a valve seat formed interiorly of said body member intermediate its opposite ends, a valve member operatively associated with said valve seat having a stem extending axially through a central opening in said seat toward said freely extending open end of said body member, biasing means in said body member for normally biasing said valve member into valve-closing engagement with said valve seat, said valve stem being so normally centered and protectively confined within the outer end portion of the bore of said tubular body member as to render it incapable of being freely grasped by the mouth of the animal independently of the body member in which it is confined, said bore being of a size sufficiently greater than that of said valve stem to permit the latter to be canted relatively to the axis of said bore against the restraining bias of said biasing means and thereby tilt said valve member into an open position relatively to its seat, said freely extending end portion of said body member having a portion of its wall bevel cut to expose and thereby provide sidewise access to the valve stem for canting the same into valve-opening position.

2. In an animal-watering device as defined in claim 1 wherein said valve stem includes an axially alined cylindrical member of enlarged diameter and wherein said freely extending end portion of said body member is bevel cut on a plane extending angularly with respect to the axis and in intersecting relation to the free end of said body member to thereby expose only a segmental portion of said enlarged cylindrical member and provide a nozzle end of a tapered cross section which may be grasped in the mouth of the animal in a manner natural for suckling to thereby tilt said valve member into valve-opening position and so effectively enable the flowing water to be sucked by the animal operating the device.

3. In an animal-watering device as defined in claim 2 wherein the freely extending end of said body member in the region of its bevel cut portion embraces the bottom and the major side portions of said cylindrical member to provide a channel for directing flow of water through the opened valve to the mouth of the animal sucking the device.

4. In an animal-watering device as defined in claim 3 wherein the outer freely extending end of said cylindrical member is axially spaced inward of the corresponding end of said main body member whereby the permissible cant of said cylindrical member is limited by engagement of the outer freely extending end thereof with the internal wall surface of said channel.

5. In an animal-watering device as defined in claim 1 wherein said body member includes an internal abutment and said biasing means consists of spring means interposed between said valve member and said abutment.

6. In an animal-watering device as defined in claim 5 wherein said internal abutment for said biasing means consists of a centrally apertured disc removably mounted in said body member in upstream spaced relation to said valve member and said spring means consists of a compression spring interposed between said disc and said valve member with its opposite ends respectively abutting said disc and valve member.

7. In an animal-watering device as defined in claim 6 wherein said apertured disc is threadedly secured in said body member with the aperture thereof in axial alinement with the central opening of said valve seat, said disc serving to meter the flow of water from its source of supply through the device when said valve member is in its opened position.

8. In an animal-watering device as defined in claim 7 wherein said apertured disc is one of a plurality of interchangeable individual discs respectively having water-metering apertures of different sizes, which discs are selectively securable in said body member to provide a predeterminately desired rate of waterflow through the device.

* * * * *

Disclaimer

3,646,955.—*Jarl Rune Olde*, Uppsala, Sweden. WATER-FEEDING DEVICE. Patent dated Mar. 7, 1972. Disclaimer filed May 31, 1974, by the inventor.

Hereby enters this disclaimer to claim 1 of said patent.

[*Official Gazette May 27, 1975.*]